US010569482B2

(12) United States Patent
Bardy et al.

(10) Patent No.: US 10,569,482 B2
(45) Date of Patent: Feb. 25, 2020

(54) METHOD OF MANUFACTURING A STRUT AND A STRUT FORMED THEREBY

(71) Applicant: SKF Aerospace France S.A.S, Saint-Vallier (FR)

(72) Inventors: Florian Bardy, Lacaune (FR); Eric Deneux, Metz (FR); Nicolas Leboss, Buvilly (FR)

(73) Assignee: SKF Aerospace France S.A.S., Saint-Vallier (FR)

( * ) Notice: Subject to any disclaimer, the term of this patent is extended or adjusted under 35 U.S.C. 154(b) by 128 days.

(21) Appl. No.: 15/726,847

(22) Filed: Oct. 6, 2017

(65) Prior Publication Data

US 2019/0105855 A1   Apr. 11, 2019

(51) Int. Cl.
*B29C 70/34* (2006.01)
*B64C 1/00* (2006.01)
*B29C 70/54* (2006.01)
*B29C 70/44* (2006.01)
*B29C 70/32* (2006.01)
*B29C 33/50* (2006.01)
*B29L 31/30* (2006.01)
*B29K 105/08* (2006.01)
*B29L 31/06* (2006.01)
*B29L 31/00* (2006.01)

(52) U.S. Cl.
CPC .......... *B29C 70/342* (2013.01); *B29C 33/505* (2013.01); *B29C 70/32* (2013.01); *B29C 70/446* (2013.01); *B29C 70/545* (2013.01); *B64C 1/00* (2013.01); *B29K 2105/08* (2013.01); *B29L 2031/06* (2013.01); *B29L 2031/3097* (2013.01); *B29L 2031/75* (2013.01); *B64C 2001/0072* (2013.01)

(58) Field of Classification Search
CPC ..... B29C 70/342; B29C 70/545; B29C 70/32; B29C 70/446; B29C 33/505; B64C 1/00; B64C 2001/0072; B29L 2031/3097; B29L 2031/06; B29L 2031/75; B29K 2105/08
See application file for complete search history.

(56) References Cited

U.S. PATENT DOCUMENTS

2005/0056503 A1\* 3/2005 Jones .................... B29C 53/564
188/321.11

FOREIGN PATENT DOCUMENTS

WO       2008119491 A2   10/2008

\* cited by examiner

*Primary Examiner* — Michael C Miggins
(74) *Attorney, Agent, or Firm* — Allen D Hertz, P.A.; Allen D. Hertz

(57) ABSTRACT

A method of fabricating a strut having a hollow central bore includes the steps of providing a mandrel and a quantity of a filament or fiber material, laying the filament or fiber material about the mandrel to form a strut having a central cylindrical section, two opposing connective end sections, a central bore extending through the strut, the central bore having two reduced diameter portions extending through each end section, and an axis extending centrally through the bore, forming a slot or slots extending inwardly from one of the connective section outer ends and terminating within the connective section or the central section, bending at least a portion of the one connective section along the slot to enlarge the bore reduced diameter section at the one end, and displacing the mandrel along the central axis and through the enlarged bore end section until the mandrel is removed from the bore.

12 Claims, 10 Drawing Sheets

METHOD OF MANUFACTURING A STRUT AND A STRUT FORMED THEREBY

BACKGROUND OF THE INVENTION

The present invention relates to struts, and more particularly to a strut used in an aerospace structure.

Aerospace struts are known and generally include a cylindrical body having opposing ends connected with an airframe. These struts typically support loading primarily in tension and compression. Some aerospace struts have been formed of composite materials such as fiber and resin.

SUMMARY OF THE INVENTION

In one aspect, the present invention is a method of fabricating a strut having a hollow central bore, the method comprises the steps of: providing a mandrel and a quantity of a filament or fiber material; laying the filament or fiber material about the mandrel to form a strut having a generally cylindrical central section, two opposing connective end sections, a central bore extending through the strut, the central bore having two reduced diameter portions extending through each end section, and an axis extending centrally through the bore; forming at least one slot extending inwardly from an outer end of one of the connective sections and terminating within the one connective section or the central section; bending at least a portion of the one connective section along the slot so as to enlarge the bore reduced diameter section at the at least one end; and displacing the mandrel generally along the central axis and through the enlarged bore end section until the mandrel is removed from the strut bore.

In another aspect, the present invention is a strut comprising an elongated body formed of laid filaments/fibers and resin, the body including a generally cylindrical central section, two opposing connective end sections, a central bore extending through the strut. The central bore has two reduced diameter portions extending through each end section and an axis extends centrally through the bore. The filaments or fibers of the central section are substantially continuous and free of fused portions.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
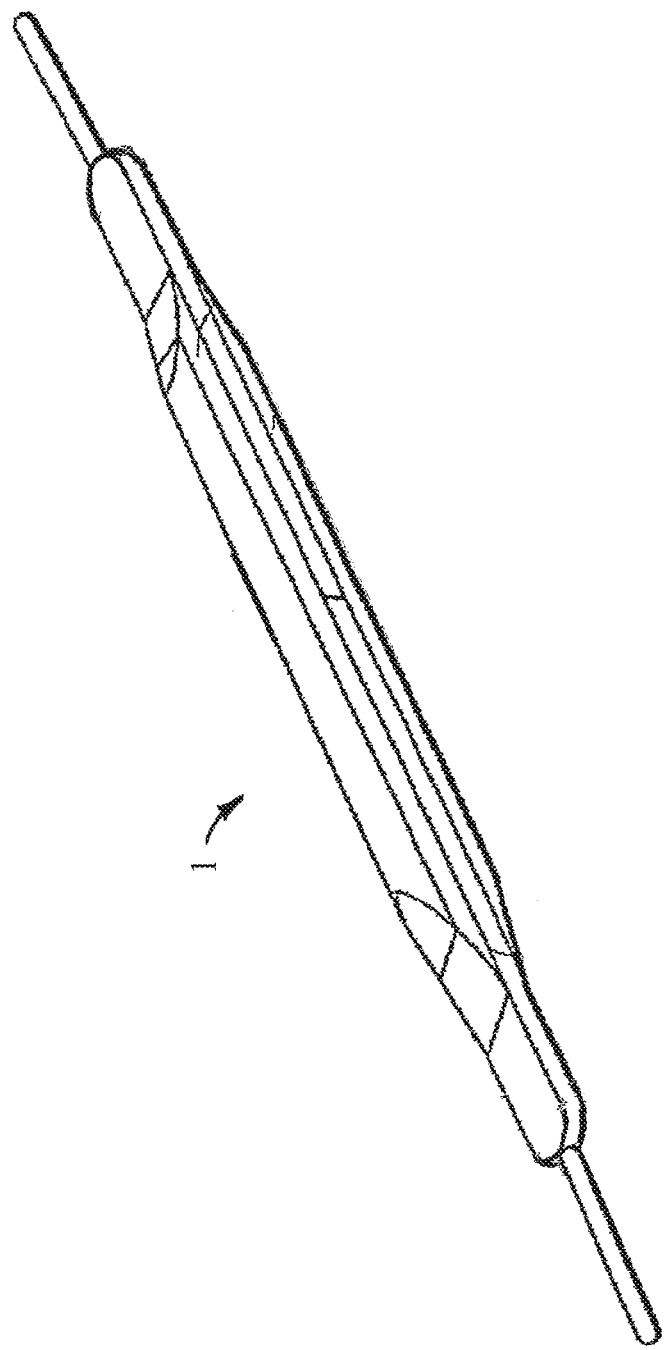
FIG. 1 is a perspective view of an exemplary mandrel for forming a strut in accordance with the present invention, the particular mandrel structure being shown for purposes of illustration only.
Figure 2:
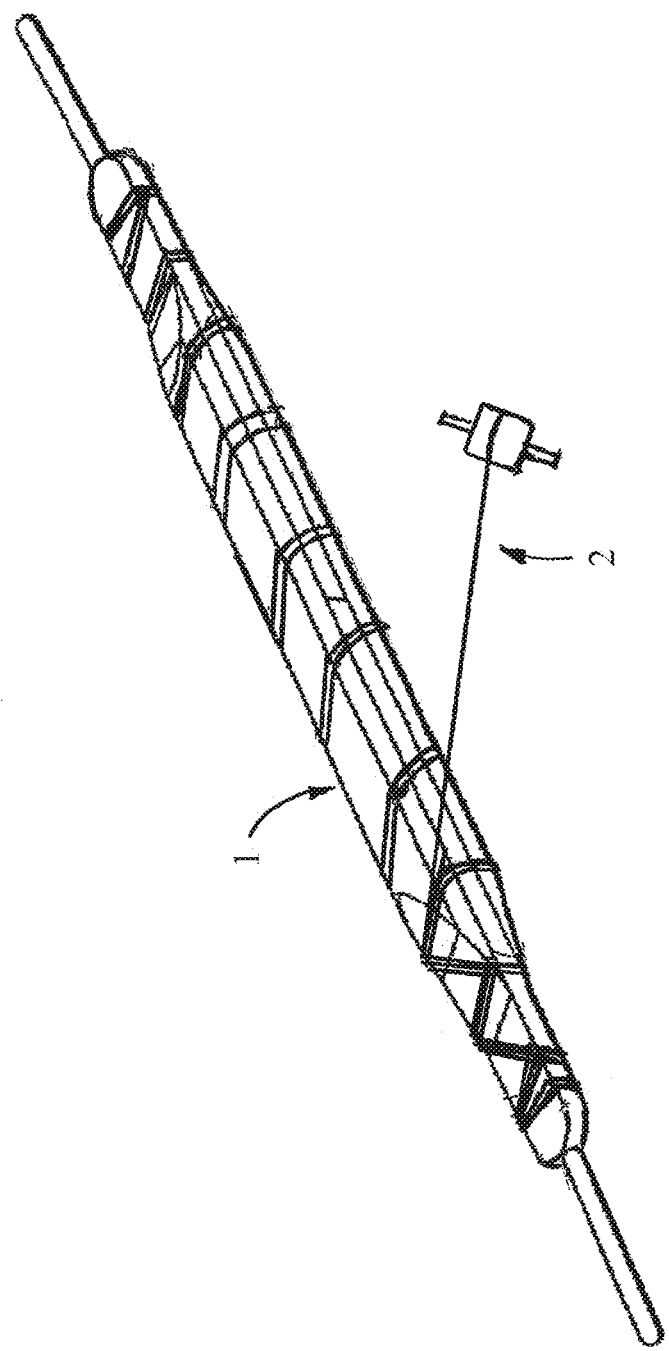
FIG. 2 is a perspective view of a quantity of filament material or fibers being winded about the mandrel.
Figure 3:
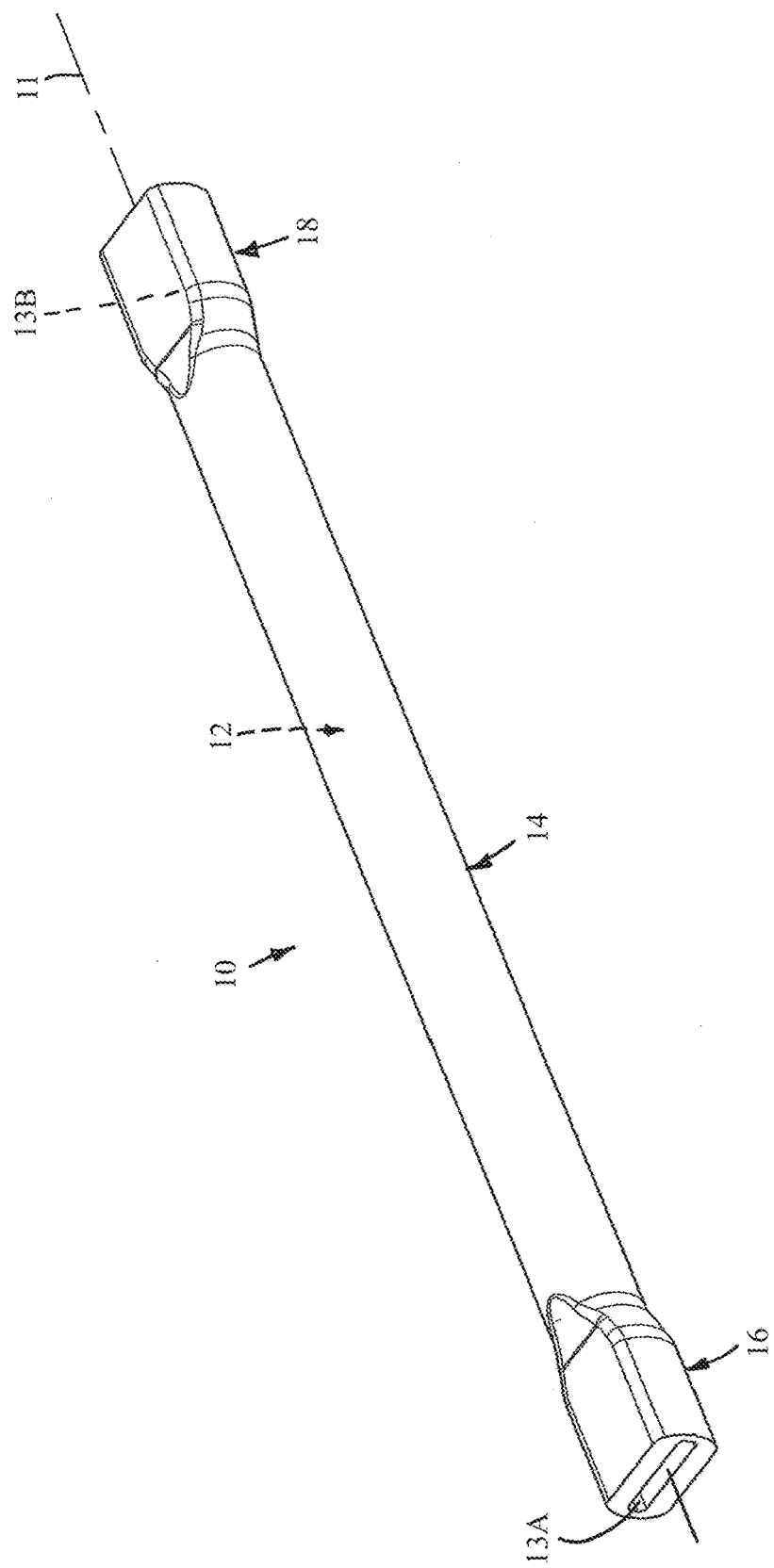
FIG. 3 is a perspective view of a strut, shown prior to curing and without the mandrel for purposes of illustration.

Referring now to the drawings in detail, wherein like numbers are used to indicate like elements throughout, there is shown in FIGS. 1-19 a method of fabricating a strut 10 having a hollow central bore 12, which comprises the following steps. A mandrel 1 and a quantity of a filament material or fiber material 2 are provided. The mandrel 1 is elongated, shaped similarly to the desired shape of the strut 10 and is formed of a metallic material, such as aluminum or steel, but may be formed generally cylindrical or any other appropriate shape, the particular mandrel 1 depicted in the drawing figures being provided for purposes of illustration only. The filament/fiber material 2 (FIG. 2) may be any of any appropriate material for an aerospace strut, such as for example, carbon, boron, glass, and may be pre-impregnated with resin, or/and may be in the form of slit tape, fabric or any other appropriate fiber material. The filament material 2 is laid about the mandrel 1 to form the strut 10, preferably using any known filament winding process but may be laid manually or by any other appropriate fiber laying process. If the filament material 2 is not pre-impregnated with resin, then the filaments or fibers are preferably impregnated with resin material during the winding process, such as by deposition, etc., so as to form a composite material when cured. The formed strut 10 has a central generally cylindrical elongated section 14, two opposing connective end sections 16, 18 and the central bore 12 extends through the strut 10. The central bore 12 has two reduced diameter portions 13A, 13B extending through each end section 16, 18 and an axis 11 extends centrally through the bore 12.

Figure 4:
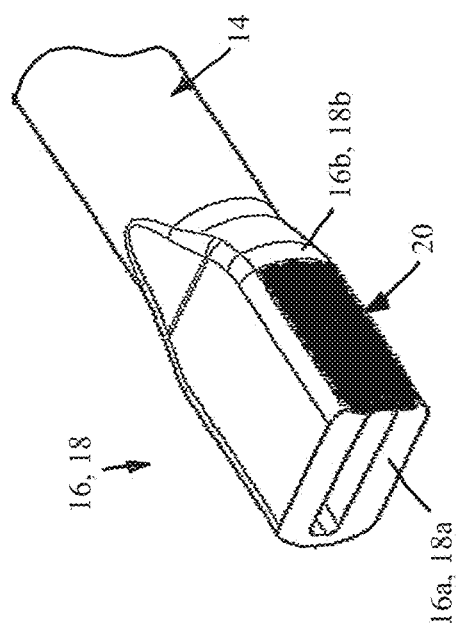
FIG. 4 is a broken-away, perspective view of a connective end of the strut of FIG. 3, shown with two slots extending parallel with respect to the strut axis.
Figure 5:
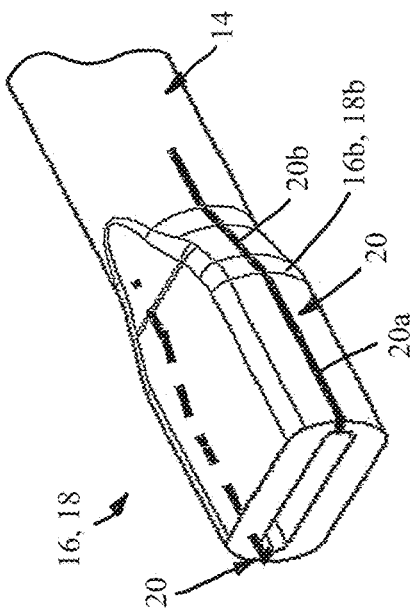
FIG. 5 is another view of the connective end, shown with a side portion of the connective end machined out to provide a slot.
Figure 6:
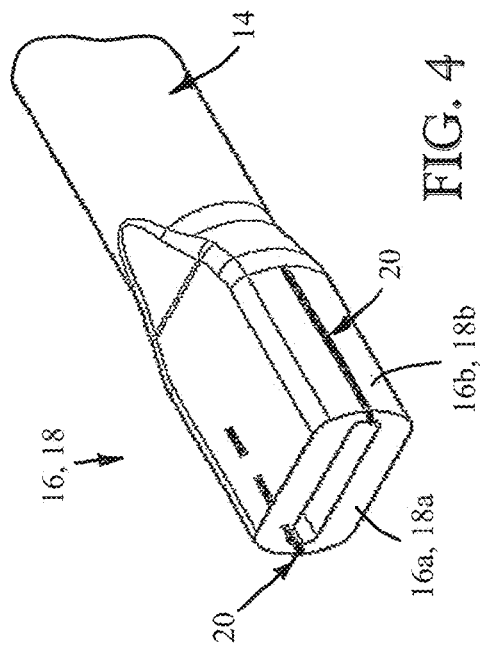
FIG. 6 is another view of the connective end, shown with a single slot extending both parallel and skewed with respect to the strut axis and extending into the strut central portion.
Figure 7:
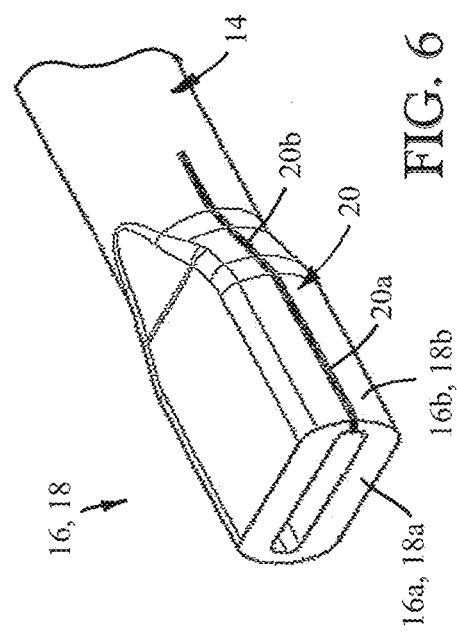
FIG. 7 is another view of the connective end, shown with two slots each extending both parallel and skewed with respect to the strut axis and extending into the strut central portion.
Figure 8:
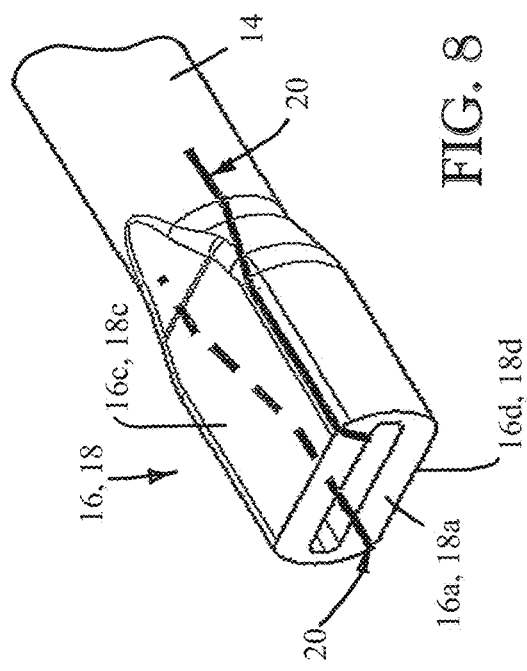
FIG. 8 is another view of the connective end, shown with two slots extending both parallel and skewed with respect to the strut axis and extending into the strut central portion, one slot formed near an upper face of the connective end and the other slot formed near a lower face of the connective end.
Figure 10:
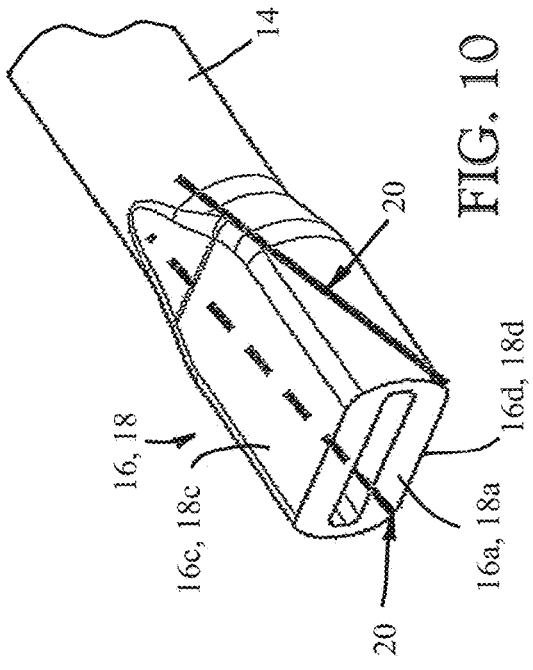
FIG. 10 is another view of the connective end, shown with two slots extending substantially skewed with respect to the strut axis and extending into the strut central portion, both slots being formed near a lower face of the connective end and extending toward the upper face.
Figure 9:
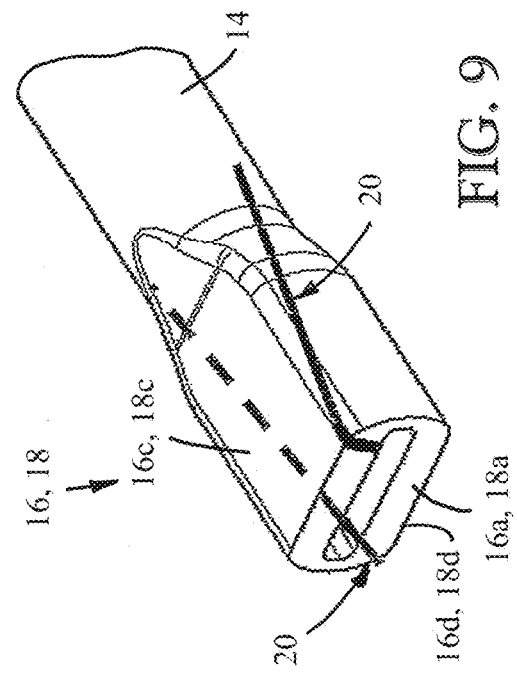
FIG. 9 is another view of the connective end, shown with two slots extending substantially skewed with respect to the strut axis and extending into the strut central portion, one slot formed near an upper face of the connective end and the other slot formed near a lower face of the connective end.
Figure 11:
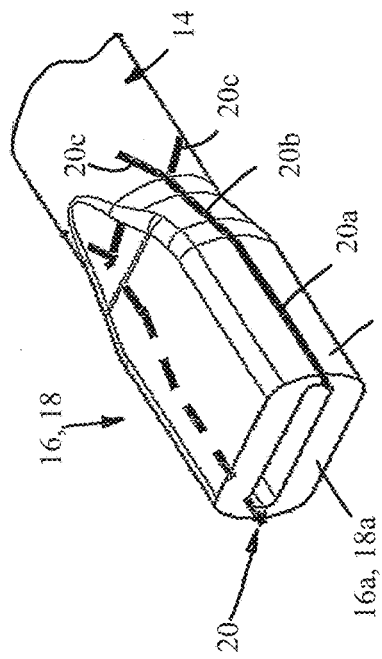
FIG. 11 is another view of the connective end, shown with a single slot extending both parallel and skewed with respect to the strut axis and extending into the strut central portion, the slot having two diverging end sections formed in the strut central portion.
Figure 12:
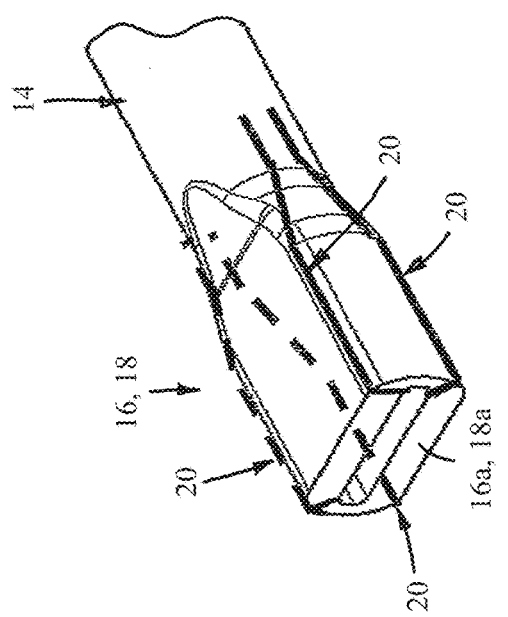
FIG. 12 is another view of the connective end, shown with a two slots each extending both parallel and skewed with respect to the strut axis and extending into the strut central portion, each slot having two diverging end sections formed in the strut central portion.
Figure 13:
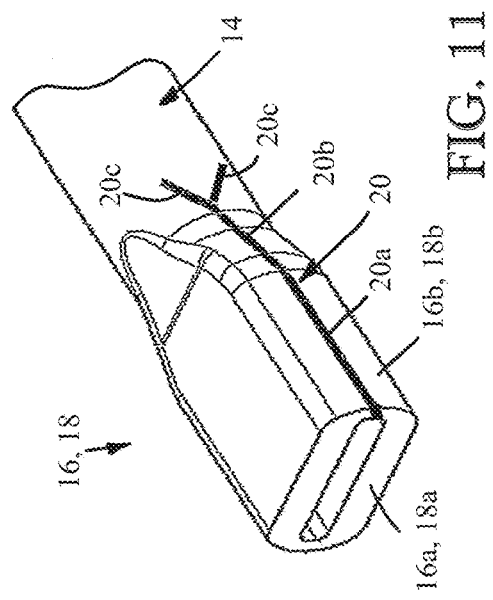
FIG. 13 is another view of the connective end, shown with a two slots each extending both parallel and skewed with respect to the strut axis and extending adjacent to upper and lower faces of the connective end proximal to the same side portion of the connective end.
Figure 14:
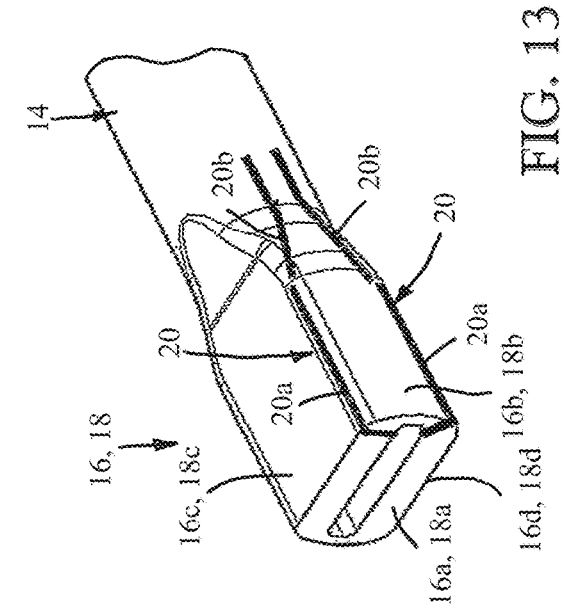
FIG. 14 is another view of the connective end, shown with a four slots each extending both parallel and skewed with respect to the strut axis, two slots extending adjacent to upper and lower faces of the connective end proximal to one side portion of the connective end and the other two slots extending adjacent to upper and lower faces of the connective end proximal to the other side portion of the connective end.

Referring to FIGS. 4-14, at least one slot 20 is formed in at least one of the end connective sections 16, 18 so as to extend inwardly from an outer end 16a or 18a and terminates within either the one connective section 16, 18 or the central section 14. Preferably, two slots 20 are formed in the at least one end section 16 or 18, such that the end section 16 or 18 is generally cantilever-like for reasons described below. The one or more slots 20 may be provided in only one end section 16 or 18 or in both end sections 16, 18. Further, the slot(s) 20 may be formed so as to extend substantially parallel with the central axis 11, as shown in FIGS. 4 and 5, or may have at least one portion 20a extending generally parallel with the central axis and at least one portion 20b extending generally skewed with respect to the central axis 11, as shown in FIGS. 6-14. The slots 20 may be formed as relatively thin cuts, by any appropriate cutting tool or process, or may be machined out to remove one or both side portions 16b or 18b of the connective end section 16, 18, respectively, as depicted in FIG. 5. Further, the slot(s) 20 may be formed generally through the middle of a side portion 16b, 18b (FIGS. 4-7, 11 and 12), substantially near an upper surface 16c, 18c or a lower surface 16d, 18d (FIGS. 8, 13 and 14) or formed extending from an upper surface 16c, 18c or lower surface 16d, 18d toward a lower surface 16d, 18d or an upper surface 16c, 16d, respectively (FIGS. 9 and 10). Furthermore, as depicted in FIGS. 11 and 12, the slot(s) 20 may each be formed with two diverging end sections 20c to further facilitate bending of the strut end sections 16, 18, as described below.

Figure 15:
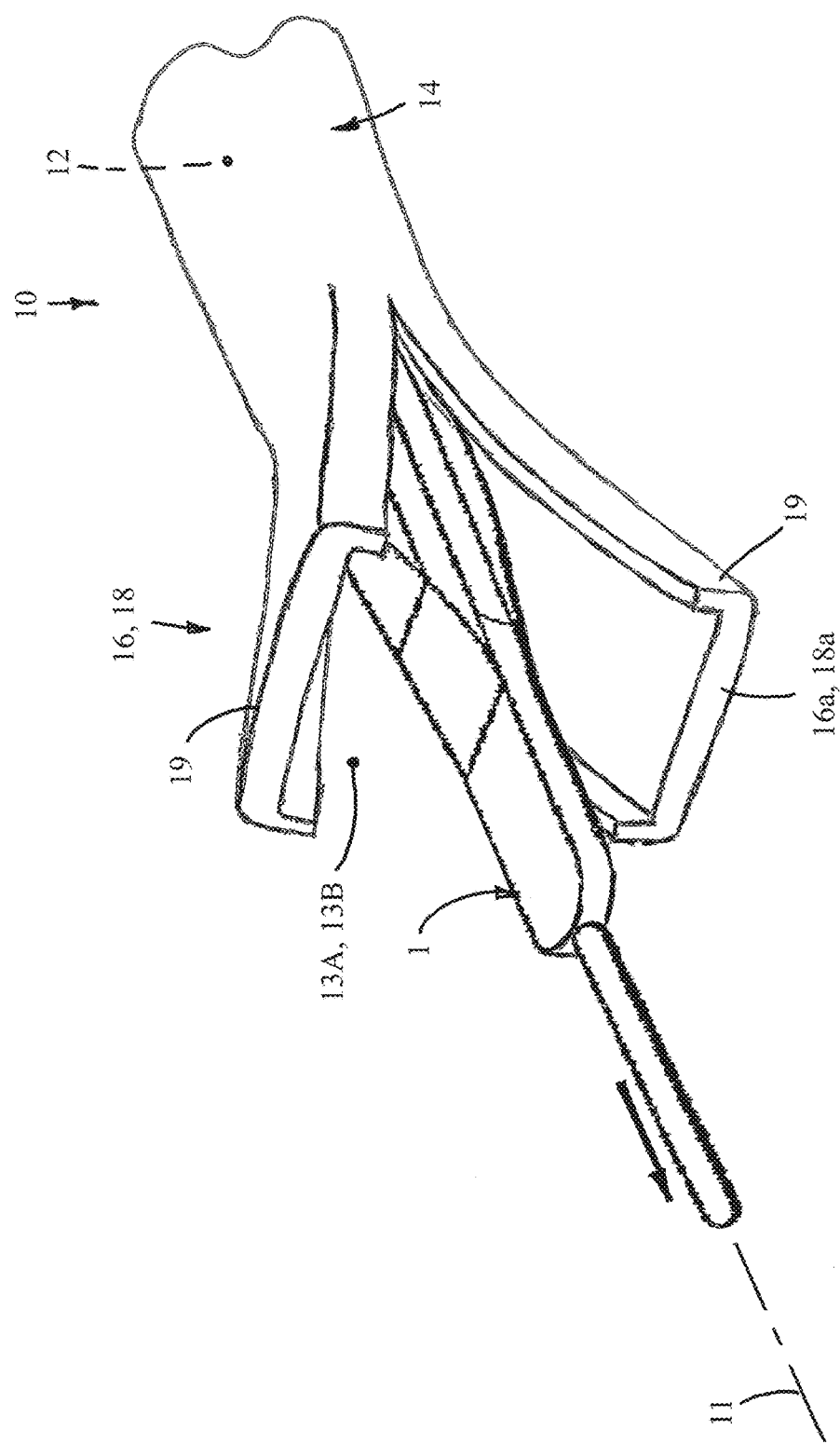
FIG. 15 is a broken-away, more diagrammatic perspective view of one connective end with two end portions bended generally away from each other to enable the mandrel to be displaced through an enlarged bore section.

Referring particularly to FIG. 15, after the slot(s) 20 are formed, at least a portion 19 of the one connective end 16 or 18 is bended generally outwardly along the slot(s) 20 so as to enlarge the bore reduced diameter section 13A or 13B at the at least one end 16 or 18. If two slots 20 have been formed, two cantilever-like portions 19 of the end section 16 or 18 are bended generally away from each other to enlarge the bore section 13A or 13B. While the end section portion(s) 19 is/are bended outwardly, the mandrel 1 is displaced generally along the central axis 11 and through the enlarged bore end section 13A or 13B until the mandrel 1 is removed from the strut bore 12.

Figure 16:
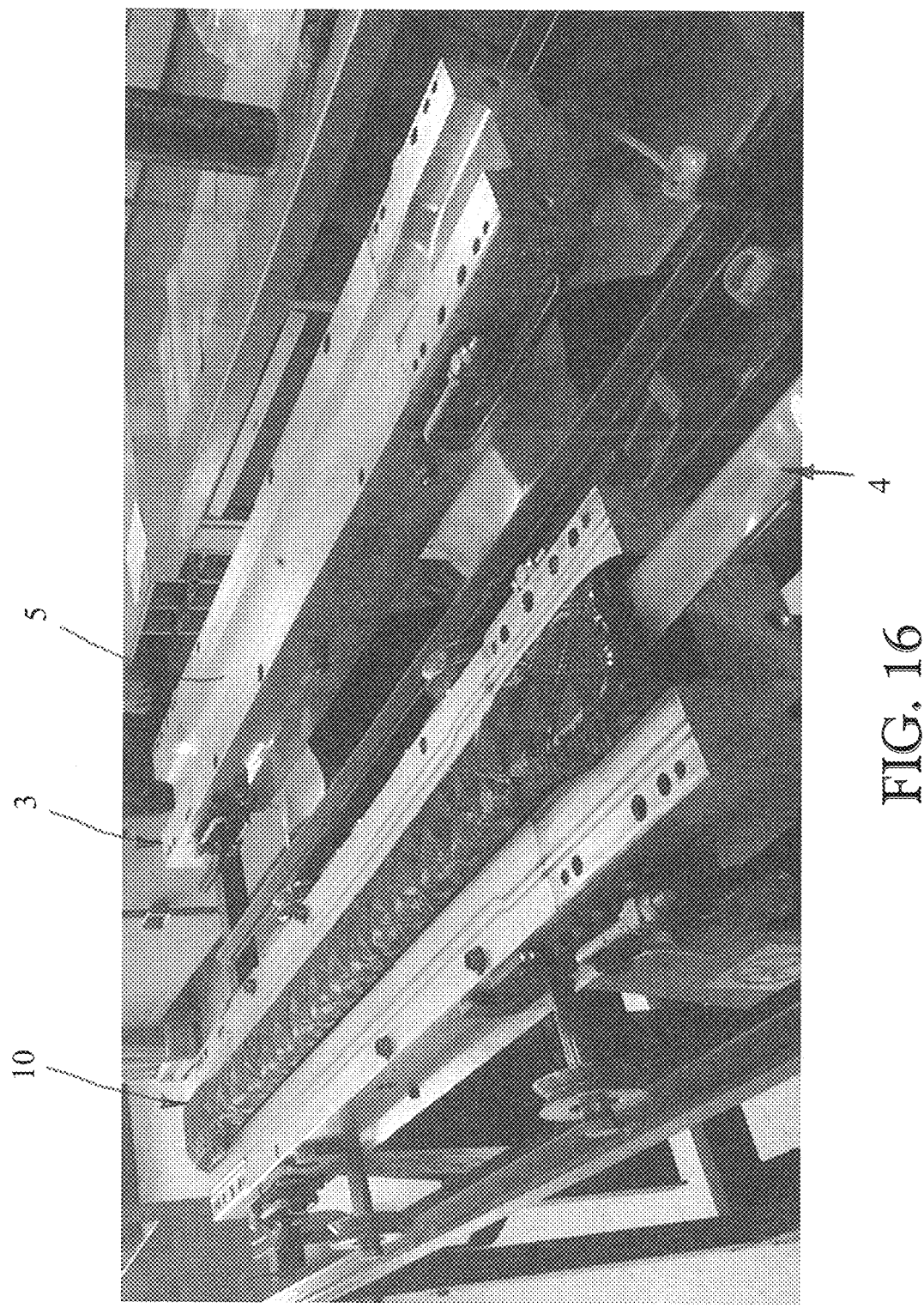
FIG. 16 is a photo of a strut disposed in a mold half with a bladder inserted within the strut bore.

Referring to FIG. 16, preferably, a mold 3 and a bladder 4 are provided for curing the strut 10 after the mandrel 1 has been removed from the strut bore 12. The mold 3 is preferably of two-piece construction and has a number of cavities 5 each shaped and sized for final forming one strut 12. The bladder 4 is inserted into the strut bore 12 and then the bladder 4 is expanded to substantially fill the central bore 12. The bladder 4 ensures that the strut 10 will not collapse during the molding process and pushes the strut 10 outwardly against the mold walls to desired final dimensions. Preferably, the bladder 4 is inserted prior to placing the strut 10 in the mold 3, but may be inserted while the strut 10 is located within the mold cavity 5. After one or more struts 12 are each positioned within a mold cavity 5, heat is applied to the mold to cure the strut 12 and transform the resin material and filament material into a rigid one-piece body of composite material. Also, the heat applied to the mold 3 fuses the portions 19 of the one or both connective end sections 16, 18 adjacent to the slot(s) 20 to substantially close the slot(s) 20.

Figure 17:
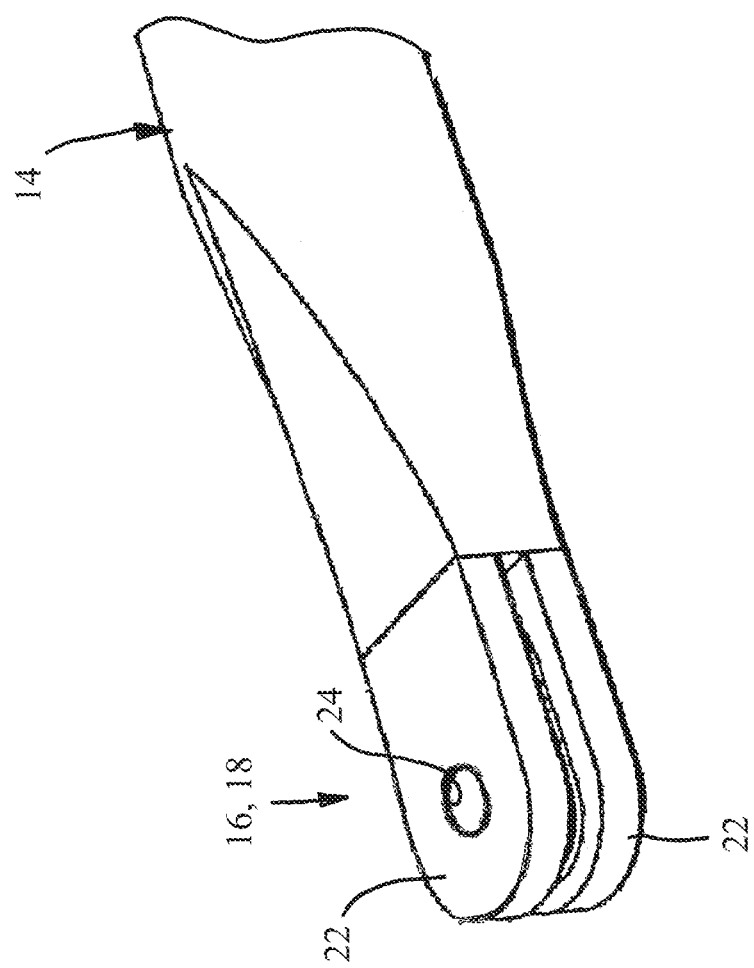
FIG. 17 is a broken-away, perspective view of a strut connective end portion after finish machining.

Referring to FIG. 17, the cured strut(s) 10 are the removed from the mold 3 and then each of the connective end sections 16 and 18 is finish machined to form two spaced-apart fork sections 22 at each end 16, 18. Preferably, the finish machining of the fork sections 22 removes at least a portion of the strut connective end section 16 and/or 18 in which the slot(s) 20 were formed. Also, at least one and preferably two aligned mounting holes 24 (only one shown) are machined (e.g., drilled) in each connective end 16, 18 during the final machining process, which receive fasteners or bolts for connecting the strut 10 to an aerospace structure.

Figure 18:
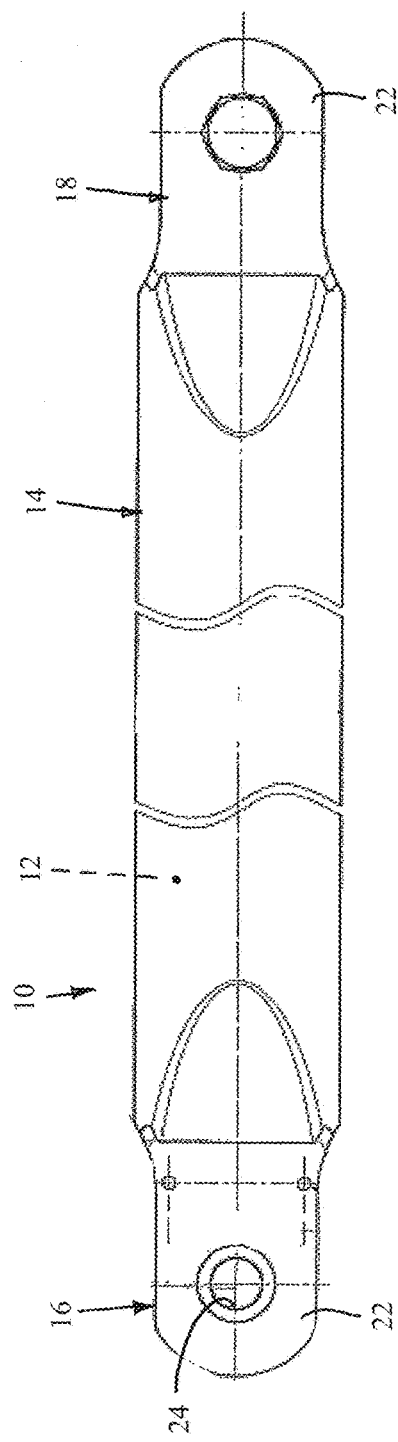
FIG. 18 is top plan view of strut formed in accordance with the present invention.
Figure 19:
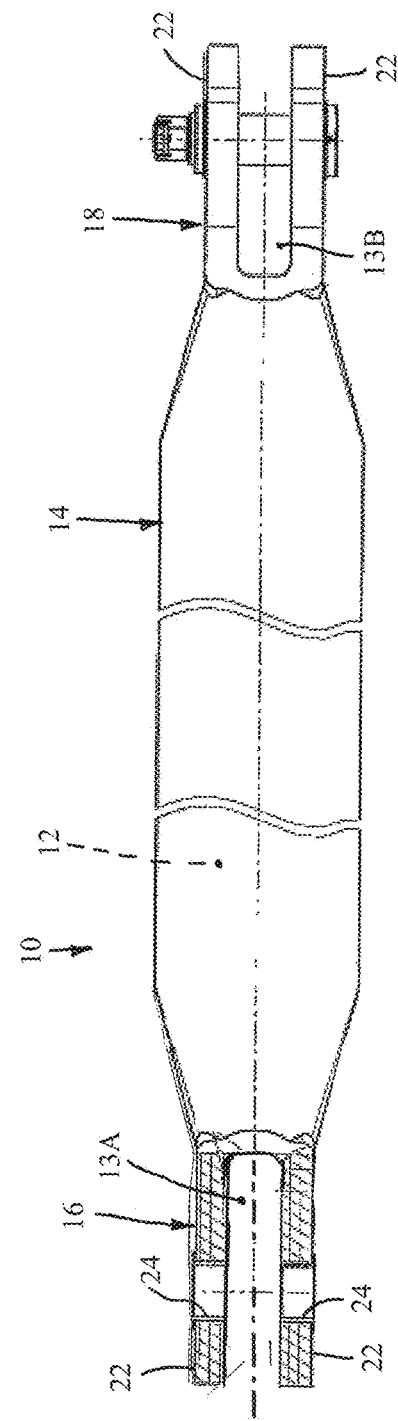
FIG. 19 is a partly broken-away, side plan view of the strut of FIG. 18.

Referring to FIGS. 18 and 19, the strut 10 formed by the above-described process is more rigid than composite struts formed by other processes, which typically formed the strut as two fused halves or with separate ends and a central section that are joined together. With the present strut 10, the filaments of the central section 14 are substantially continuous and substantially free of fused portions due to the slots 20 being entirely or primarily in the connective end sections 16 or/and 18. In other words, by having the slot(s) 20 at most extending only a minimal length into the central section 14, the winded filaments/fibers and resin material forms a substantially integral composite body without weakened fused sections that could cause failure of the strut 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined generally herein and in the appended claims.

We claim:

1. A method of fabricating a strut having a hollow central bore, the method comprising the steps of:

providing a mandrel and a quantity of a filament or fiber material;

laying the filament or fiber material about the mandrel to form a strut having a central generally cylindrical section, two opposing connective end sections, a central bore extending through the strut, the central bore having two reduced diameter portions extending through each end section, and an axis extending centrally through the bore;

forming at least one slot extending inwardly from an outer end of one of the connective sections and terminating within the one connective section or the central section;

bending at least a portion of the one connective section along the slot so as to enlarge the bore reduced diameter section at the at least one end; and displacing the mandrel generally along the central axis and through the enlarged bore end section until the mandrel is removed from the strut bore.

2. The method as recited in claim 1 wherein the step of laying the filament or fiber material includes winding the filament material about the mandrel.

3. The method as recited in claim 1 further comprising the step of impregnating the laid filaments with resin.

4. The method as recited in claim 1 wherein the step of providing at least one slot includes cutting the one strut connective end to form the slot.

5. The method as recited in claim 1 wherein the step of providing at least one slot includes providing two slots in each strut end such that each strut section is generally cantilever-like.

6. The method as recited in claim 1 wherein the step of forming the slot includes at least one of forming a plurality of slots in the one connective end and forming at least one slot in each one of the two connective ends.

7. The method as recited in claim 1 wherein the step of forming a slot includes at least one of:

forming a slot extending substantially parallel with the central axis;

forming a slot having at least one portion extending generally parallel with the central axis and at least one portion extending generally skewed with respect to the central axis.

8. The method as recited in claim 1 further comprising the steps of:

providing a mold and a bladder;

inserting a bladder into the strut bore and expanding the bladder to substantially fill the central bore;

applying heat to the mold so as to cure the strut.

9. The method as recited in claim 8 wherein the step of applying heat to the mold fuses portions of the at least one connective end section adjacent to the at least one slot to substantially close the slot.

10. The method as recited in claim 1 further comprising the step of finish machining each of one the two strut connective sections to form two spaced-apart fork sections at each end.

11. The method as recited in claim 10 wherein the step of machining the fork sections removes at least a portion of the at least one strut connective end section in which the slot was formed.

12. A strut comprising:

an elongated body formed of laid filaments or fibers, the body including a generally cylindrical central section, two opposing connective end sections, a central bore extending through the strut, the central bore having two reduced diameter portions extending through each end section, and an axis extending centrally through the bore, the filaments or fibers of the central section being substantially continuous and free of fused portions.

* * * * *